(12) United States Patent
Heuring

(10) Patent No.: US 6,965,878 B1
(45) Date of Patent: Nov. 15, 2005

(54) CURRENCY AND CREDIT RATING SYSTEM FOR BUSINESS-TO-BUSINESS TRANSACTION

(76) Inventor: Klaus Heuring, 20533 Biscayne Blvd. Apt. 241, Miami, FL (US) 33180

( * ) Notice: Subject to any disclaimer, the term of this patent is extended or adjusted under 35 U.S.C. 154(b) by 741 days.

(21) Appl. No.: 09/639,533

(22) Filed: Aug. 16, 2000

(51) Int. Cl.⁷ ............................................. G06F 17/60
(52) U.S. Cl. ......................................... 705/37; 705/26
(58) Field of Search ............................. 705/37, 39, 40, 705/35, 36, 38, 42; 395/219, 214

(56) References Cited

U.S. PATENT DOCUMENTS

| | | | |
|---|---|---|---|
| 5,592,376 A | 1/1997 | Hodroff | 705/14 |
| 5,687,323 A | 11/1997 | Hodroff | 705/30 |
| 6,260,024 B1 * | 7/2001 | Shkedy | 705/37 |

FOREIGN PATENT DOCUMENTS

| WO | WO 97/220073 | * | 6/1997 |
|---|---|---|---|
| WO | WO 01/39081 A2 | * | 5/2001 |

OTHER PUBLICATIONS

Fraser, J., Credit Lines with a Twist, Journal Article, Journal Code: INO, Inc. v16v10 PP: 130, Oct. 1994.☐☐* http://www.bivine.com/help/newmember/mathService.jsp as of Jun. 23, 2000.
http://www.itex.com/about/barter.asp as of Jun. 23, 2000.
http://www.itex.com/about as of Jun. 23, 2000.
http://www.barteritonline.com/rules_of_use.htm as of Jun. 23, 2000.

* cited by examiner

Primary Examiner—Hani M. Kazimi
Assistant Examiner—Stefano Karmis

(57) ABSTRACT

This invention is a system to increase the profitability of businesses by facilitating transactions between members of trade exchanges. Global-Cash flexible currency is a currency made up of part cash and part products or services in a ratio pre-selected by individual merchants. Global-cash flexible currency allows bartering merchants to recoup the costs of their goods in cash while keeping their asking prices down. Business trade is further facilitated by the extension of credit to traders and barterers under the Global-Cash credit scoring system. The Global-Cash credit scoring system takes into consideration the product or service offered in trade, the percent offered in trade, which is cash and the remaining percent, which is the value of the listings, and a possible host of other variables. A credit rating score is calculated and a novel way of calculating credit-worthiness is hereby disclosed.

3 Claims, 2 Drawing Sheets

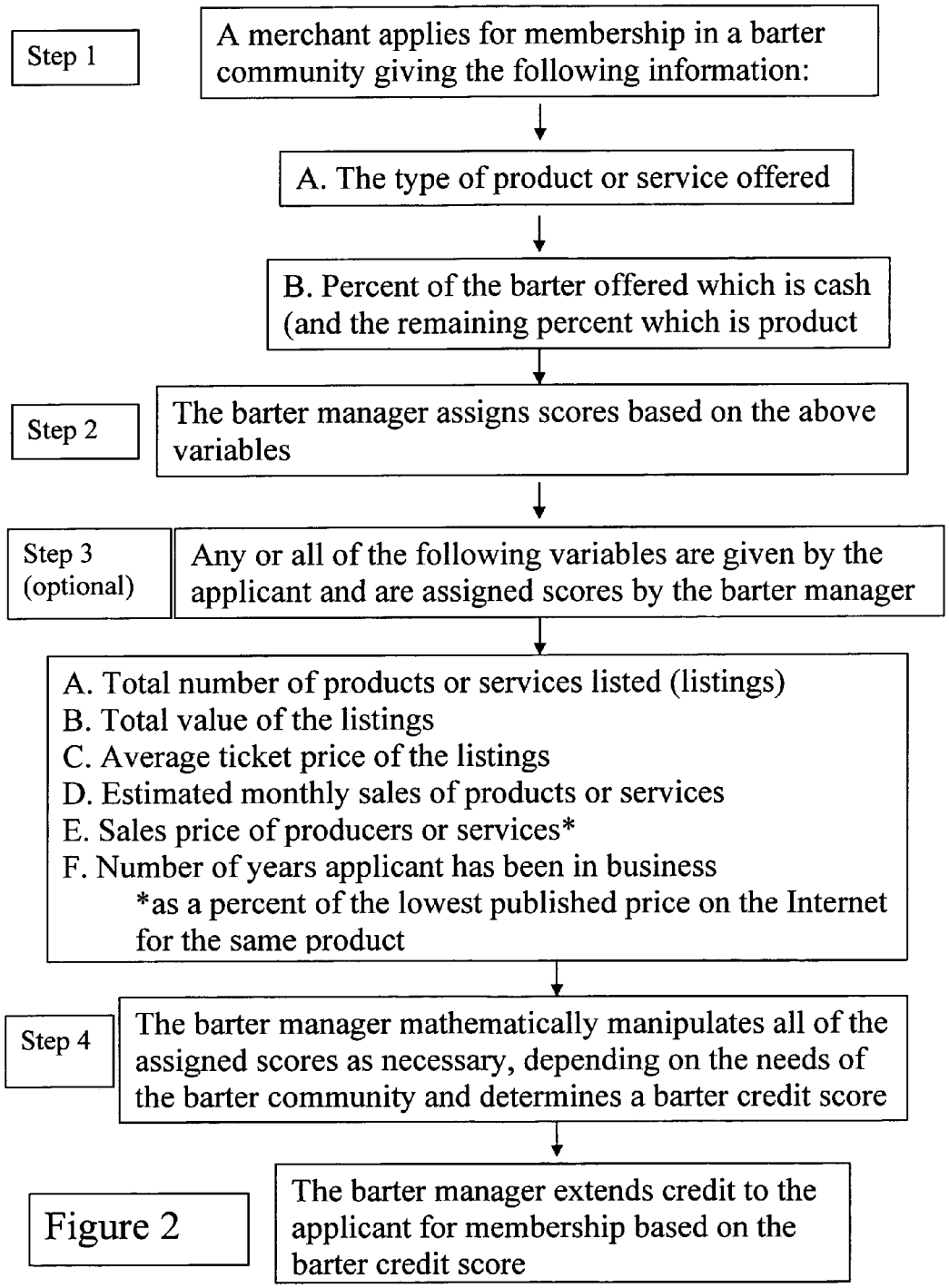

CURRENCY AND CREDIT RATING SYSTEM FOR BUSINESS-TO-BUSINESS TRANSACTION

FIELD OF THE INVENTION

Information processing system organization.

BACKGROUND OF THE INVENTION

The barter industry is divided into trade exchanges whereby discrete associations of business operators and professionals are brought together in communication networks in order to trade with new partners, ones that they might not have found without such networks.

Business-to-business trading and the barter industry allow for people and businesses to trade and thereby increase their total numbers of transactions while preserving vital cash flow. Barter communities offer members the possibility of trading with one another and afford their members access to new markets, markets that the barterers may not have thought to seek out. New markets and new customers are brought to the traders and the traders are able to offer their excess inventories and/or untapped capacities to perform services for trade. The benefit of barter is that transactions are made with little cash flow, if any, and excess inventory and capacity to perform services are offered in exchange for something that is needed by the business owner or professional with very little cost to the trading members.

Each trade exchange has its own policies determining how a member business or professional may trade with other members. Each trade exchange has a system of accounting for each member's monetary units due or owed, and perhaps a system of converting those units to currency. With each transaction, trade units are transferred from the buyer's account to the seller's account. This is not very different from the workings of a bank. The barter companies facilitate trading members trading in products or services only, but they also allow traders to transact their business partly in cash, if the traders agree upon the cash portion beforehand. As an example, a hotelier may want to trade for three computers at $1000 each. That hotelier offers in exchange 15 nights accommodation that are normally worth $200 per night. If the computer trader decides that this deal can only be accomplished if the hotelier pays 60% cash and 40% trade, and the hotelier agrees, then the deal will go as follows:

1. the computer dealer will trade the computers to the hotelier,
2. the hotelier will pay $1800 to the computer dealer,
3. the barter company will keep an accounting of ONLY the barter part of the transaction as follows
   a. the barter company will deduct 6 nights ($1200 worth of services) from the account of the hotelier, and
   b. credit $1200 worth of product/services to the account of the computer dealer, and
4. the barter company will assess any applicable fees.

The $1800 cash paid for the computers is never accounted for by the barter company, only the part of the transaction that equals the room nights is accounted for by the barter accounting system. There is a need in the barter industry for a currency that is made up of part cash and part product or service. This hybrid currency will allow barterers and business-to-business traders to transact business more easily and without unnecessary negotiation regarding cash. The point of bartering is to facilitate transactions. Extra business is possible due to the existence of the trade exchanges, which offer an alternative means for their members to communicate. There are currently no barter companies that allow their members to trade in a flexible currency, which is made up of a percentage of cash and trade, determined by the individual members.

DESCRIPTION OF RELATED ART INCLUDING INFORMATION DISCLOSED UNDER 37 C.F.R. 1.98

Other methods of devising a hybrid cash/trade currency system have been disclosed. For example, U.S. Pat. No. 5,592,376, (Currency and barter exchange debit card and system, to Hodroff), describes a currency system for bartering services using a combination of cash and "Community Economic Development Scrip", a new currency based on non-cash service credits. However, the Hodroff invention is not concerned with business-to-business trading, nor does it concern for-profit traders trading with one another. This patent necessarily involves at least one non-profit institution, at least one for-profit company, and a third party who does community service work for the non-profit, in exchange for credits that may be used at the for-profit institution. There is a need for a hybrid system of currency to be used in business-to-business transactions.

U.S. Pat. No. 5,687,323 (Dual currency debit card patent to Hodroff), describes a system for keeping track of the transactions and debts of users of the Currency Exchange system described in the previous patent to Hodroff, (U.S. Pat. No. 5,592,376), but again does not address a system of keeping track of business-to-business transactions, and more important, it does not address the need in the art for a credit rating system for its members.

In the barter and business-to-business trade communities, credit is extended to the participating member in much the same manner as credit is extended to those who seek bank loans and other forms of conventional credit. (See http://www.itex.com/about/barter.asp, http://www.itex.com/about, http://www.barteritonline.com/rules of use.htm, and http://www.bigvine.com/help/newmember/mathService.jsp, as of Jun. 23, 2000. Liquid assets and the resultant ability to repay a debt are important considerations in determining whether or not credit will be extended to an applicant. While the simple ability to repay a debt is important in extending credit in the barter industry, the product or service offered is just as important. There are some traders in the barter industry who are certainly most able to repay a simple debt, but who offer a product or service in trade for which there is simply very little demand. The wheels of the barter industry turn on trade, not simply on transactions involving cash currency, and the extension of credit within the barter industry should reflect the importance of different products and services offered. There is a need in the industry for a credit rating system which takes into consideration exactly what a trader is willing to offer.

SUMMARY OF THE INVENTION

This invention allows members to trade with all other members without ever having to negotiate cash portions of individual trades. This invention allows members of barter communities and business-to-business traders to become better able to market their products and services by offering them for trade in a new environment, one where there is no need to negotiate separate cash transactions.

This invention allows users to increase sales by offering extra product or services during slower periods and allows those traders to determine how much cash they need in order to stay comfortably in business. E.g., a hotelier may decide that he needs to cover his overhead and expenses in cash, but he can take the remainder of his usual fee in trade, an amount he may use for trades at a later date, when he is free to use those credits. In the usual manner of conducting a barter transaction, or a business-to-business trade, if one trader determines that he needs a portion of the trade in cash, then he needs to negotiate that with each individual with whom he transacts trades. One of the objects of this invention, Global-Cash, is a flexible trade currency. Flexible trade currency means the percent of cash and trade that he will both accept and offer in exchanging products and/or services. That percentage can be the difference between wholesale and retail prices of the product or service. Usually, when cash and trade are involved in a barter transaction, the relative percentages are determined by the seller. In this invention, Global-Cash flexible currency is used for transactions, but the percent cash offered and accepted may be different. An attorney may determine that a 10:90 cash to trade ratio is best for him and a car dealer may use a 80:20 ratio. When that attorney barters for a $20,000 car in this situation, he will offer $2000 cash and $18,000 in services, and the barter manager will give the car dealer $16,000 cash and credit him with $4000 worth of product and/or services.

This flexible currency system, Global-Cash, is an element of a second object of this invention, a new system of extending credit to members of business-to-business trading and barter communities. Currently, trade exchanges extend credit to members based on their ability to repay a debt. There are no trade exchanges in the barter industry who extend credit to members of their networks based on the category of the products and/or services offered and the sales price of the products and/or services in relation to the member's self-selected ratio of Global-Cash flexible currency and hard currency that that member is willing to accept in trade for his products and services.

BRIEF DESCRIPTION OF THE DRAWINGS

FIG. 1 shows the necessary steps in this invention.

FIG. 2 is a flow chart showing a more elaborate application and scoring process for an applicant and barter community manager.

DETAILED DESCRIPTION OF THE INVENTION

I. Hybrid Currency

Figure 1:
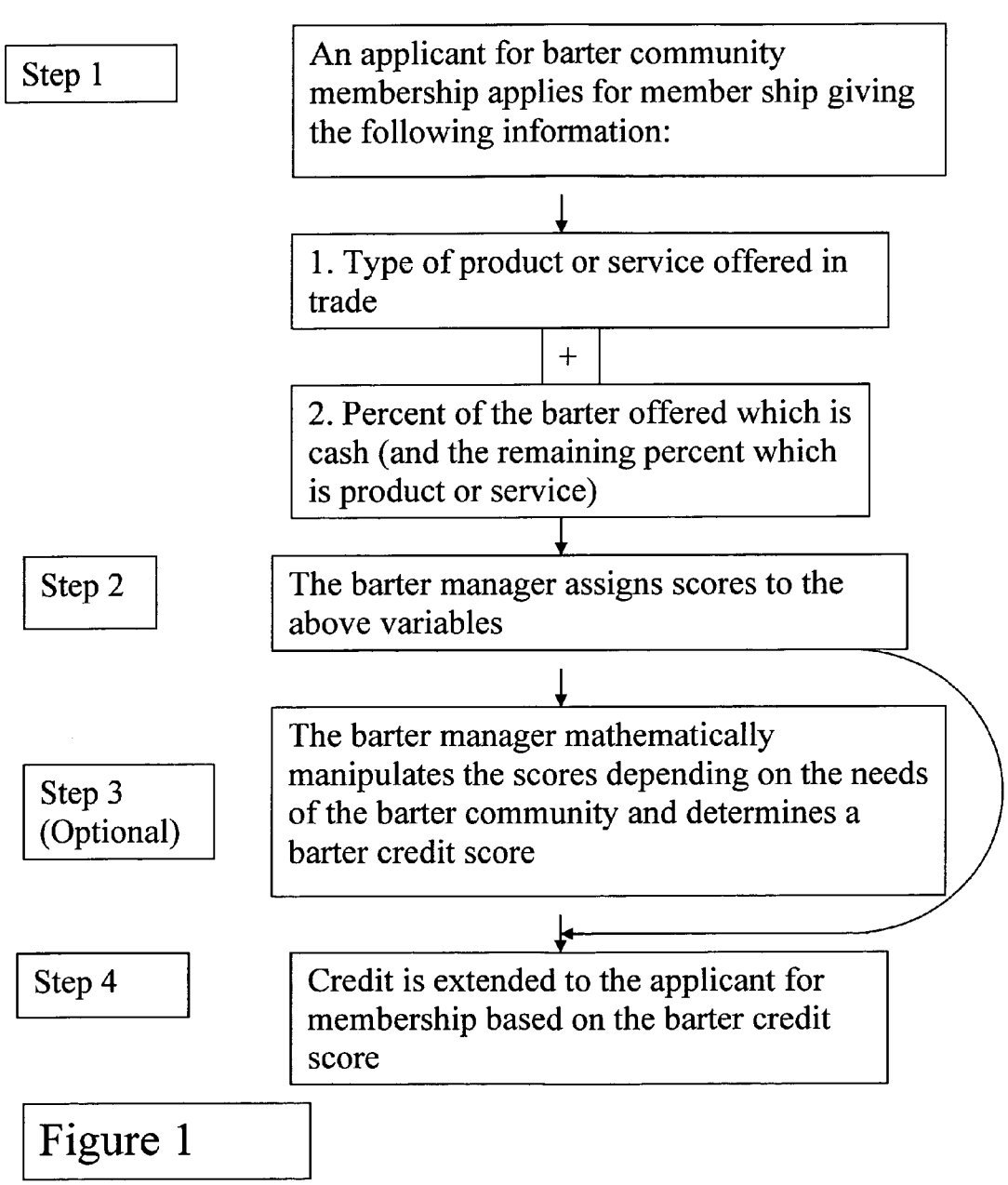
FIG. 1 is a simple flow chart showing the steps a merchant applicant and a barter community manager go through when an applicant applies for membership, and the manager scores the applicant.

Global-Cash flexible currency is an invention that allows barterers and business-to-business traders to determine how much cash they need to accept in a barter-type transaction in order stay comfortably in business. It is a hybrid currency system for individual trading members of business-to-business trading communities where each individual member selects a percentage of cash and barter that he is willing to accept in trade for his product or service, and which he is willing to offer in trade. The percentage is variable and is determined by each individual member. This solves the problem that barterers often face when negotiating transactions in barter systems where partial cash trading is allowed, but not the norm, or where partial cash transactions are simply not allowed, or where a trader does not care to have to negotiate extra details of each and every trade he makes.

In this system, a merchant chooses the mix of cash and product and/or services (his individualized Global-Cash flexible currency) that is he is willing to both accept and offer in trade.

EXAMPLE 1

Dealing in a 50:50 cash to trade ratio, when, e.g. a jewelry store operates with a cost of goods of 50% of the retail sales price, this merchant chooses a program of 50% Global-Cash (or more or less) and 50% standard currency. On this basis, when the merchant makes a sale in this system for $1000, his Global-Cash flexible currency account would reflect a balance of $500 cash, which he can withdraw at any time. He then withdraws the $500 cash. Now this merchant wishes to purchase a product from another member of this community, e.g. a $200 television. He uses $100 from his Global-Cash trade account (leaving $400 from the jewelry transaction) and he has to deposit $100 cash into his account with the barter company to finalize the transaction, because he had already withdrawn the $500 cash. (This merchant is dealing in a 50:50 ratio, cash to trade.) Furthermore, if the television dealer has selected an 80:20 cash to trade ratio, he will be paid $160 cash by the barter manager even though the jeweler has paid the barter manager only $100 cash for this transaction.

Each merchant has the ability to manage his account, i.e. to deposit and withdraw available cash at will. If a merchant tries to make a purchase, and does not have enough cash in his account, then he will be notified by the barter manager.

There is no requirement that a merchant chooses a percentage that is a multiple of ten, and no requirement that he choose a percentage that will allow him to cover the cost of his inventory/overhead expenses. The foregoing is simply an example to illustrate how this hybrid cash/trade currency system works.

The barter company keeps an accounting of the entire transaction. In the jewelry example above, the merchant is able to withdraw half of his sales price in cash, but he must use the remaining portion of his sales price in trade. There is no requirement regarding how he trades with his Global-Cash flexible currency, or with whom he trades. All such transactions are recorded by the barter group manager and the credits and debits of each individual trading member are kept for reference.

In this system, there must be least 2 people to trade with one another, and those making trades do not have to trade in person, they can be connected across the internet or other electronic means, including telephone or fax, or simply via the barter network.

All of the necessary accounting involved in this currency system can be done by hand or by a computer program.

II. Global-Cash Flexible Currency Credit Scoring System

There are many factors that may be considered in granting a line of credit to an applicant. In this invention, two factors are necessary, and the others listed below are ancillary. For this invention to work, the category of the product or service offered for trade must be evaluated and assigned a score, and the percent of trade that the applicant is willing to take in exchange for his product or service that is cash must be given a score. The sales price of the product is important but not essential to this invention, especially if there are other products on the market that are similar or identical to the one offered by the applicant.

The overall score a trader is given in evaluating his credit-worthiness is determined by mathematically manipulating the scores given for the type of product offered, (the product value score), and the score given for the percent cash that that trader is willing to accept, (the cash value score) as well as the scores for other possible factors, (including but not limited to a score for the total number of a trader's listings, the total cash values of those listings, the average ticket price of those listings, the percent above the lowest advertised price on the internet of those products which are identical to products offered by other vendors, the length of time the trader has been in business at the time of application, and the estimated monthly sales of the trader. The mathematical manipulations used to determine the barter score value may be simple addition, multiplication or raising values of one factor to the power of another value. For instance, if the product value score is 50 and the cash value score is 35, the barter credit score would be 85 if these are the only scores taken into consideration and they are simply added. If, however, the barter manager feels that a better indication of credit-worthiness at a given time would be determined more heavily by the product value score, he can double the product value score and add that to the cash value score. (50×2+35=135).

A person using this credit scoring system can take as few as two variables into consideration, (category of product and percent Global-Cash flexible currency), or that person can take many other variables into consideration when extending a line of credit. The example below takes seven variables into consideration. Tables 1 through 7 show numerical values assigned to the variables found to be important in extending credit to members of trade exchanges. Five points is a relatively low score and one hundred a relatively high score counting toward the total points an applicant can be assigned for a category in calculating that applicant's credit-worthiness. The exact point values given are not as important as the relative values.

The heart of the credit scoring system is the interaction between the cash value score and the product value score (i.e. the product or service offered). By offering some cash in every transaction, or a relatively high amount, (e.g. 50% cash) then the barter company can extend a higher line of credit because the cash is immediately liquid, while one night in a hotel room is not. So according to table 2, 50% cash translates to 50 points in the total calculation of creditworthiness, again, a relatively high number of points. The category of the product or service offered is equally vital to the operation of this invention. No barter company has ever offered credit based on the type of product a member/credit applicant had to offer, and one's product or service is arguably the most important thing a member has to offer a barter community.

All scores for applicants are to be kept in a registry for comparison and general record keeping. It is neither necessary to make the scores available to the applicants or the general public, nor is it necessary to keep the scores secret.

TABLE 1

Credit rating scoring card

| Product Categories | Score |
|---|---|
| advertising newspaper | 35 |
| community newspaper | 35 |
| major newspaper | 70 |
| advertising magazines | 50 |
| national magazines | 65 |

TABLE 1-continued

Credit rating scoring card

| Product Categories | Score |
|---|---|
| local magazines | 50 |
| advertising TV | 50 |
| local TV | 45 |
| network TV | 65 |
| advertising radio | 30 |
| local radio | 30 |
| network radio | 35 |
| advertising outdoor | 55 |
| advertising indoor | 45 |
| advertising internet | 50 |
| advertising specialties | 40 |
| antiques and collectibles | 35 |
| art and jewelry | 40 |
| auto marine plane | 50 |
| automotive used | 40 |
| automotive new | 85 |
| boat used | 50 |
| boat new | 80 |
| plane used | 55 |
| plane new | 66 |
| business opportunities | 15 |
| business products | 50 |
| business products new | 65 |
| business products used | 35 |
| business services | 10 |
| computer hardware | 50 |
| computer hardware new | 75 |
| computer hardware used | 45 |
| computer software | 40 |
| computer software new | 55 |
| computer software used | 35 |
| health and fitness | 20 |
| health and fitness products | 40 |
| health and fitness services | 10 |
| home and personal | 20 |
| home and personal products | 40 |
| home and personal services | 10 |
| merchandising | 35 |
| real estate | 65 |
| travel and vacation | 35 |
| airline | 65 |
| hotel | 35 |
| cruise | 50 |
| entertainment | 25 |
| restaurants | 35 |
| packages | 45 |

Table 1 shows the point values assigned for different types of businesses, higher numbers correlate with more desirable products and services in the barter industry. Desirability can be a function of both scarcity and of the product or service or unwillingness of the usual business owner or professional to offer that type of product or service for trade in a barter community, and how much members of a barter community desire to have this product or service offered them.

TABLE 2

Credit rating scoring card

| Percent Global-Cash | Score |
|---|---|
| 5 | 5 |
| 10 | 10 |
| 15 | 15 |
| 20 | 20 |
| 25 | 25 |
| 30 | 30 |
| 35 | 35 |
| 40 | 40 |

TABLE 2-continued

Credit rating scoring card

| Percent Global-Cash | Score |
|---|---|
| 45 | 45 |
| 50 | 50 |
| 55 | 55 |
| 60 | 60 |
| 65 | 65 |
| 70 | 70 |
| 75 | 75 |
| 80 | 80 |
| 85 | 85 |
| 90 | 90 |
| 95 | 95 |
| 100 | 100 |

TABLE 3

Credit rating scoring card

| Total Number of Listings | Score |
|---|---|
| 0–10 | 5 |
| 11–25 | 10 |
| 26–50 | 20 |
| 51–100 | 40 |
| 101–250 | 60 |
| 251–500 | 80 |
| 500+ | 100 |

TABLE 4

Credit rating scoring card

| Total Value of Listings | Score |
|---|---|
| $0–$5000 | 5 |
| $5001–$25,000 | 10 |
| $25,000–$50,000 | 15 |
| $50,000–$100,000 | 20 |
| $100,000–$250,000 | 25 |
| $250,000+ | 30 |

TABLE 5

Credit rating scoring card

| Average Ticket Price | Score |
|---|---|
| $0–$25 | 2 |
| $25–$50 | 5 |
| $51–$75 | 7 |
| $76–$100 | 10 |
| $101–$150 | 15 |
| $151–$250 | 20 |
| $251–$500 | 25 |
| $501–$1000 | 30 |
| $1001–$2500 | 35 |
| $2501–$5000 | 40 |
| $5001–$10,000 | 45 |
| $10,001–$25,000 | 50 |

TABLE 6

Credit rating scoring card

| Estimated Monthly Sales | score |
|---|---|
| $500–$1000 | 5 |
| $1001–$2500 | 10 |
| $2501–$5000 | 15 |

TABLE 6-continued

Credit rating scoring card

| Estimated Monthly Sales | score |
|---|---|
| $5001–$10,000 | 20 |
| $10,001–$25,000 | 25 |
| $25,001–$50,000 | 30 |
| $50,001–$100,000 | 35 |
| $100,001–$250,000 | 40 |
| $250,001–$500,000 | 45 |
| $500,000–$1,0000,000 | 60 |

TABLE 7

Credit rating scoring card

| Sales Price* | Score |
|---|---|
| 35%+ | 5 |
| 30%–35% | 10 |
| 25%–29% | 15 |
| 20%–24% | 20 |
| 15%–19% | 25 |
| 10%–19% | 30 |
| 5%–9% | 35 |
| 0%–4% | 50 |
| 0% | 75 |

*as a percent above the lowest published price on the internet for the same product

TABLE 8

Credit rating scoring card

| Number of Years in Business | Score |
|---|---|
| 0–1 | 5 |
| 1 5 | 10 |
| 6–10 | 15 |
| 11–25 | 20 |
| 25 + years | 25 |

TABLE 9

Credit rating scoring card

| Total Points | Line of Credit |
|---|---|
| 750+ | negotiable upon request |
| 650–749 | $10,000 |
| 550–649 | $7500 |
| 450–549 | $5000 |
| 350–449 | $3000 |
| 300–349 | $1500 |
| 250–299 | $1000 |
| 200–249 | $0 (none) |

Table 2 shows the point assignments for percent cash offered in trade. Table 3 shows the point totals assigned for the number of listings a trader offers to the barter community, higher number of listings translate to a greater chance that some member of the community will be interested in something that the applicant has to offer. Table 4 shows the scores for the total value of the listings. An application is given more points for bringing more value in trade to the exchange. Table 5 shows the score given for the average ticket price of each of an applicant's listings. Table 6 shows the values given to the dollar amounts equal to the estimated total monthly sales of the product or service sold through the trade exchange. Table 7 shows the points given for the price of the listing above the lowest advertised price on the Internet for which the same item is offered. It is in the best interest of the barter community when members offer products at competitive prices. Granted, it is expected that the products offered are to be exchanged for the excess inventory of other members, but the more competitive the offering prices, the greater number of transactions a member is likely to perform. Table 8 shows the scores assigned for the number of years an applicant has already been in business. The longer a company or professional has been in business, the more likely it is that this applicant will be a valuable member of the trade community. Table 9 shows sample credit lines offered based on the total score for these hypothetical applicants.

credit scoring values, (product values score, cash value score and, and sales price score), as these factors have the most impact on global shopping.

EXAMPLE OF OPERATION

A computer hardware dealer desires to enter into a barter group and apply for credit. The products he offers are new desktop and laptop personal computers. Based on the categories shown in table 1, his category is worth 75 points and therefore his product value score is 75 points. This dealer is willing to enter the barter group at a 25:75 cash to barter ratio, and according to table 2, the cash value score is 25

TABLE 10

Credit Rating Examples for Different Business Types

| Type of Business | Category X3 | % Global-Cash X2 | Number of Listings | Total Value Of Listings | Average Ticket Price | Estimated Monthly Sales | Sales Price* X2 | How Long in Business | Total Score |
|---|---|---|---|---|---|---|---|---|---|
| Hotel | 35 | 50 | 5 | 10 | 10 | 10 | 30 | 10 | 310 |
| Airline | 65 | 35 | 5 | 15 | 25 | 20 | 35 | 10 | 410 |
| Advertising Magazine | 50 | 65 | 5 | 15 | 35 | 15 | 25 | 10 | 410 |
| Computer Hardware | 75 | 25 | 40 | 20 | 25 | 20 | 30 | 10 | 450 |
| TV Local Advertising | 45 | 50 | 5 | 15 | 30 | 15 | 35 | 10 | 380 |
| Art Dealer | 40 | 65 | 20 | 20 | 30 | 15 | 25 | 10 | 395 |
| Attorney | 10 | 100 | 5 | 5 | 25 | 10 | 25 | 10 | 335 |
| Restaurant | 35 | 50 | 5 | 5 | 2 | 5 | 25 | 10 | 282 |
| Car Dealer-New | 85 | 10 | 10 | 25 | 50 | 25 | 35 | 10 | 465 |
| Office Equipment New | 65 | 35 | 20 | 20 | 25 | 15 | 35 | 10 | 425 |
| Jeweler | 40 | 50 | 40 | 20 | 20 | 10 | 35 | 10 | 390 |
| Book Store | 40 | 50 | 40 | 15 | 2 | 10 | 25 | 10 | 347 |
| Internet Advertising | 50 | 50 | 5 | 15 | 30 | 15 | 30 | 10 | 385 |
| Real Estate | 65 | 10 | 10 | 30 | 50 | 35 | 35 | 10 | 420 |
| Physician | 10 | 80 | 5 | 5 | 15 | 10 | 35 | 10 | 305 |

*Sales Price is calculated from the percent above the lowest published price on the internet for the same product In Table 10, all of the point values are tabulated for a number of different hypothetical applicants. Some of the point values for the columns are multiplied by a factor of two or three before being tabulated. In this example, the product value score is multiplied by a factor of three, the cash value score is multiplied by a factor of two and the average sales price above the lowest advertised price on the internet is multiplied by a factor of two. This manipulation of the scores allows for a customization of the scoring in many different ways based on the current needs of the barter company. If there is little diversity in the types of services offered, the points given for the category of service, i.e. the product value score, can be raised/multiplied by a factor greater than one. If more cash is needed in the system, then points given for cash value score can be raised. If the price structure is not competitive, then the score for the sales price can be multiplied by a greater factor. In other words, all of these values can be manipulated based on the economical needs of the system. The scoring system allows the people running the barter community, those offering credit to members, to be aggressive or conservative in each of the main points on the barter credit scoring scale. He has 100 computers to offer in trade, and on table 3 that translates to 40 points (for his "number of products" score). The total value of his listings is $50,000 and that translated to (a "number of products or services offered" score of) 20 points on the credit scoring scale. The average price of each computer is $500 and that translates to (an "average sales price score" of) 25 points. His estimated monthly sales is $7000 a month and that is worth 20 ("gross monthly sales" score) points, the "percent over the lowest advertised same item on the Internet" is 10% score is worth 30 points, he has been in business for 2 years and that gives him (a "number of years in business" score of) 10 points. The total number of points is 245, (75+25+40+20+25+20+30+10=245). However, due to the needs of the system, the scorer, (the barter manager), deems that at this point in time, the product value scores should be worth 3 times their normal value, the cash value scores should be worth 2 times their normal point values, and the sales price as a percent over the lowest advertised internet price should be worth double its normal score as well. Therefore, his score is 450, (75×3+25×2+40+20+25+20+30×2+10=450) and according to table 9, that translates to a credit line of $5000.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A computer-implemented method of scoring a credit applicant, in order to extend a line of credit to said applicant, in a business-to-business trading community wherein the traders offer products and or services in trade, comprising:
   i) establishing a product value score for said products or services, based on desirability of said products or services offered for barter, wherein said products or services are of differing value; and
   ii) establishing a cash value score based on the percent of the barter offered by said applicant, which is comprised of product or service, the remainder of the trade comprising cash,
   iii) inputting said product value score and said cash score value into a computer-based registry;
   iv) mathematically manipulating said scores to produce a barter credit score; and
   v) extending a line of credit to said applicant based on said barter credit score.

2. The method of claim 1 further comprising the following steps:
   i) establishing a score based on any or all of the following variables,
      a) the number-of-products-or-services offered for barter by said applicant,
      b) the average-sales-price of said products or services offered for barter by said applicant,
      c) the estimated gross-monthly-sales, based on the estimated average gross monthly sales of said products or services offered for barter by said applicant,
      d) the number of years in business, based on the number of years said applicant has been in business,
      e) the total value of products or services offered for barter by the applicant,
      f) the sales price of said products or services as a percent above the lowest published price on the Internet for the same product or service,
   ii) inputting said scores into a computer-based registry, and
   iii) mathematically manipulating each of said scores to produce a barter credit score.

3. The method of claim 1 further comprising the following steps:
   comparing the value of products or services offered for barter or business-to-business trade by at least two businesses or barterers in a trading community; and
   assigning comparative values to said products or services based on the relative value of said products or services in the trading community.

* * * * *